United States Patent Office 3,523,086

Patented Aug. 4, 1970

3,523,086
MAGNETIC RECORDING MATERIAL

Johann Heinrich Bisschops, Berchem, and Willy Karel Van Landeghem, Saint-Gilles-Waas, Belgium, assignors to Gevaert-Agfa N.V., Mortsel, Belgium, a company of Belgium No Drawing. Filed May 16, 1967, Ser. No. 638,734
Claims priority, application Great Britain, May 16, 1966, 21,545/66
Int. Cl. H01f *1/26*
U.S. Cl. 252—62.54 6 Claims

ABSTRACT OF THE DISCLOSURE

In a magnetic recording material, a recording layer consisting essentially of about 65–85% by weight of powdered magnetic material dispersed in an organic polymeric binder and as a lubricant, about 3–6% by weight of the magnetic material of a compound according to the following general structure:

$$Cl—(CF_2—CFCl)_n—Cl$$

wherein $n$ is an integer of at least 5, the polymeric binder being characterized by the presence of an isocyanate modified polyester or polyester amide.

The present invention relates to improved magnetic recording material, more particularly to magnetic recording material with improved resistance to wear.

Commonly used magnetic recording materials are manufactured in the form of a tape comprising a non-magnetic base whereto magnetic particles dispersed in a non-magnetic binder are applied.

Magnetic recording media for use in recording at high speed e.g. in a magnetic tape transport unit used in data storage or video recording, are subjected to wear in consequence of intensive friction during the tape transport. As a result of the wear loose particles can deposit onto the tape surface or adhere to the parts of the tape transport unit in contact with the tape. These loose particles agglomerating to lumps can give rise to a loss of signal or "drop-outs."

Some coatings of magnetic recording materials can contain binders that yield a very high resistance to abrasion such as e.g. hardened elastomeric polyurethane resins. The resistance to abrasion can, however, be improved yet with a lubricating agent making part of the recording material.

Many lubricating agents have been proposed already for that purpose e.g. fatty acid esters (see e.g. United Kingdom patent specification 1,009,774). In order to obtain a sufficient lubricating effect, these lubricating agents have to be used in such amounts that they soften the magnetic recording layer thereby decreasing its scratch resistance, and/or exude from the recording layer. When exuding from the recording layer they cause undesirable layer to layer adhesion while the tape is wound on reels. Also a detrimental transfer of dust or abraded particles from coating to the back can occur. Further it has been found with respect to said lubricants that frequently repeated passing of the recording tape on the same coating area can give rise to local accumulation of lubricant and to a strong increase of the friction coefficient.

It has been found now that by incorporating a chlorofluorocarbon compound having the following general structure:

$$Cl—(CF_2—CFCl)_n—Cl$$

wherein: $n$ stands for the number of repeating units, which is preferably at least 5; into a magnetic recording material comprising a coating containing a powdered magnetic material dispersed in a binder, the said coating does not show or only shows to a much lower extent the disadvantages associated with known lubricating agents for magnetic coatings.

Preferably used compounds according to said general formula have a molecular weight varying between 650 and 10,000.

Said chlorofluorocarbons are non-acidic and non-corrosive to metals and are thermally stable up to a temperature of 250° C.

Most surprising, however, is the increase in durability on repeatedly passing the same area of a recording layer in contact with the recording head, and the slight exudation of the lubricating agent from the coating, which makes the lubricant very suited for heavy-duty magnetic recording.

The said chlorofluorocarbons are prepared starting from hexachloroethane by M. W. Kellog & Co., Jersey City, N.J., U.S.A. and marketed under the names Kel–F by Minnesota Mining and Manufacturing Co., St. Paul, Minn., U.S.A., Fluorothene by Union Carbide & Carbon, New York, N.Y., U.S.A., and Voltalef by Compagnie de Produits Chimiques et Electrométallurgiques Pechiney, Paris, France.

According to the present invention the chlorofluorocarbon lubricant is used in an amount of 3 to 6% by weight in respect of the magnetic particles.

According to a preferred technique the lubricant is mixed, e.g. in a ball-mill, with the powdered magnetic material and a dispersing agent therefor in a suitable solvent. In this mixture the binding agent is dissolved. The coarse particles, which remained after grinding, are removed and the composition is deaerated before coating on a base.

Suitable solvents are relatively volatile aromatic hydrocarbons or chlorinated hydrocarbons, e.g., 1,2-dichloroethane. The lubricants used in the present invention can be readily dispersed or dissolved in the usual binders, which can be polyvinylchloride, copolymers of vinylidene chloride and acrylonitrile, polyvinyl acetate, polyacrylic acid esters, such as polybutyl acrylate, copolymers of vinyl alcohol with vinyl acetate, vinyl butyral, vinyl chloride, or vinylidene chloride, different classes of polyurethanes and isocyanate-modified polyesters and polyester amides.

Any of the usual magnetic particles may be used in the recording elements of the invention, for example magnetic iron oxide particles, magnetite, and mixed ferrites. The preferred particles are of the oxidic type, are elongated or acicular in shape, e.g. acicular $\gamma$-$Fe_2O_3$, and are preferably from 0.2 to 2.0 microns long and from 0.02 to 0.6 micron wide.

The magnetic coating preferably contains 65 to 85% by weight of magnetic powder. The binder has a more or less flexible character depending on the intended use of the recording material. Elastomers, which can be hardened to some extent, are preferred for manufacturing the magnetic coating of recording tapes. Curing improves the resistance to wear and calendering improves the smoothness of the coating and packing of the magnetic material.

Flexible as well as rigid bases can be used. The base may have any geometrical form, e.g. it may be in the form of a disc, drum, or tape, and may be made of any convenient material such as glass, plastic, or metal. A preferred base material is made of oriented polyethylene terephthalate film.

Other suitable bases are made of paper, cellulose triacetate, and oriented polyvinyl chloride. The base may have any thickness depending on the intended use of the recording material. The base of a recording tape usually has a thickness of 0.01 mm. to 0.06 mm. The base may be of any width, for example of 6 mm. to 50 mm., and of any length.

The following examples illustrate the present invention without, however, limiting it thereto.

The indicated parts are parts by weight.

EXAMPLE 1

A mixture comprising the following ingredients was ball-milled for 48 hours:

100 parts of needle-shaped $\gamma$-$Fe_2O_3$ 4 parts of a dispersing compound prepared according to preparation 1 of the United Kingdom patent specification 1,058,426, as described below 12.5 parts of partially hydrolysed copoly(vinyl chloride/vinyl acetate) comprising 2.3% of free hydroxyl groups and 3% of vinyl acetate groups 5 g. of a chlorofluorocarbon having the following formula $Cl—(CF_2—CFCl)_n—Cl$ and a molecular weight of 1500

200 parts of 1,2-dichloroethane.

The following products were added to this mixture:

10.5 parts of polyester amide modified with a poly-isocyanate resulting from the reaction of 4 parts of hexamethylene diisocyanate with 100 parts of a polyesteramide, which was prepared by condensing 7.5 mole of ethylene glycol, 9 mole of adipic acid, and 1.5 mole of ethanolamine, 125 parts of 1,2-dichloroethane.

Milling was continued for 24 hours. A mixture of 6 parts of a 75% solution of the reaction product of 1 mole of 1,3,6-hexanetriol and 3 mole of hexamethylene diisocyanate in 1,2-dichloroethane was added to the above composition.

The resulting dispersion was applied to a polyethylene terephthalate base and dried thereon at 120° C. The thickness of the dry recording layer was 10$\mu$.

The resulting recording tape was tested as to its resistance to wear on a tape tester (Potter—Model 3320-1001-7 of Potter Instrument Co. Inc., Plainview, N.Y., U.S.A. The tape tester is arranged as to be able to test a short length of tape automatically (app. 2 m. in this experiment). One cycle of recording, playback and rewinding is called a "pass." The number of passes the tape can perform without (showing) a permanent drop-out is taken as a measure of the resistance to wear. In this experiment a drop-out is defined as a loss of signal level of more than 50% at a bit density of 800 bits per inch.

The tape prepared according to the present example was resisting more than 70,000 "passes," before one drop-out was detected.

Preparation 1 as referred to above is prepared in the following manner:

An amount of 6000 gm. of a polyester resulting from the condensation of 2.5 mole of adipic acid, 0.5 mole of orthophthalic acid and 4 mole of trimethylolpropane and characterized by a hydroxy content of 9% by weight, a water content lower than 0.15% and a viscosity at 75° C. of 3000 cps., is dried in vacuo (10 mm. Hg) for 2 hours at 120° C. To the dried polyester are added 1644 gm. of diethyl phosphite and 1.2 gm. of zinc acetate as a catalyst. The reaction mixture is then heated at 170° C. for 3 hours while stirring and while 800 ccs. ethanol are distilled off during this period.

Next the reaction mixture is placed in vacuo for 30 minutes in order to collect non-reacted diethyl phosphite from the highly viscous final product.

The determination of the acid proportion of the final product by potentiometric titration yields 0.75 milliequivalent per gram. The proportion of unesterified hydroxyl groups is 25%.

EXAMPLE 2

The tape prepared as described in the foregoing example was tested as to its resistance to wear in a "slant track" video recorder (Philips Medical Video Recorder). In this apparatus a revolving head helically scans the tape at 50 revolutions per second.

The tape was tested by reproducing a so-called "still-picture," which was formed by repeatedly reproducing the information contained in one track corresponding to one "field" (non-interlineated T.V. image).

When operating in this way, it usually lasted no longer than 15 to 20 seconds, before the picture on the television screen faded.

It was possible to use the tape for 1 hour in "still-picture" reproduction, without any perceptible reduction in quality.

What we claim is:

1. A magnetic recording material comprising a recording layer consisting essentially of about 65–85% by weight of a powdered magnetic material dispersed in an organic polymeric binding agent and about 3–6% by weight of said magnetic material of lubricant improving the resistance to wear, wherein said lubricant is a compound according to the following general structure:

$$Cl—(CF_2—CFCl)_n—Cl$$

wherein: $n$ is an integer of at least 5, and said organic binding agent comprises an isocyanate-modified polyester or polyester amide.

2. A magnetic recording material according to claim 1, wherein said lubricant has a molecular weight comprised between 650 and 10,000.

3. A magnetic recording material according to claim 1, wherein said magnetic material is magnetic iron oxide particles.

4. A magnetic recording material according to claim 3, wherein the magnetic particles are $\gamma$-$Fe_2O_3$ particles.

5. A magnetic recording material according to claim 1, wherein said polymeric binding agent consists essentially of an isocyanate-modified polyester or polyester amide, a vinylchloride vinylacetate copolymer, and a polyurethane.

6. A magnetic recording material according to claim 1, wherein the layer is present on a flexible base.

References Cited

UNITED STATES PATENTS

| | | | |
|---|---|---|---|
| 2,602,824 | 7/1952 | Padbury et al. | 260—653 |
| 3,150,995 | 9/1964 | Bauer | 117—138.8 |
| 3,293,203 | 12/1966 | Paulus | 260—37 |
| 3,423,233 | 1/1969 | Akashi et al. | 117—121 |

TOBIAS E. LEVOW, Primary Examiner

A. P. DEMERS, Assistant Examiner

U.S. Cl. X.R.

117—235